US009020999B2

(12) United States Patent
Rai Bhatti (10) Patent No.: US 9,020,999 B2
(45) Date of Patent: Apr. 28, 2015

(54) COMPUTING DEVICE WITH AUTOMATED CONVERSION OF UNITS

(71) Applicant: BlackBerry Limited, Waterloo (CA)

(72) Inventor: Arjun Singh Rai Bhatti, Ottawa (CA)

(73) Assignee: BlackBerry Limited, Waterloo (CA)

( * ) Notice: Subject to any disclaimer, the term of this patent is extended or adjusted under 35 U.S.C. 154(b) by 135 days.

(21) Appl. No.: 13/632,450

(22) Filed: Oct. 1, 2012

(65) Prior Publication Data

US 2014/0095562 A1     Apr. 3, 2014

(51) Int. Cl.
*G06F 15/00* (2006.01)
*G06F 9/44* (2006.01)
*G06F 15/02* (2006.01)
*G06F 17/22* (2006.01)

(52) U.S. Cl.
CPC .......... *G06F 15/0258* (2013.01); *G06F 9/4448* (2013.01); *G06F 17/2276* (2013.01)

(58) Field of Classification Search
None
See application file for complete search history.

(56) References Cited

U.S. PATENT DOCUMENTS

| | | | |
|---|---|---|---|
| 7,788,306 B2 * | 8/2010 | Dykes et al. | 708/206 |
| 8,200,290 B2 | 6/2012 | Chen | |
| 8,443,018 B2 * | 5/2013 | Choi et al. | 708/201 |
| 2001/0011241 A1 * | 8/2001 | Nemzow | 705/35 |
| 2003/0220795 A1 | 11/2003 | Arayasantiparb et al. | |
| 2004/0176115 A1 * | 9/2004 | Atkin et al. | 455/466 |

FOREIGN PATENT DOCUMENTS

| | | |
|---|---|---|
| EP | 2199928 A1 | 6/2010 |
| WO | 0067117 A1 | 11/2000 |
| WO | 0073949 A1 | 12/2000 |

OTHER PUBLICATIONS

European Search Report Jan. 2, 2013 from corresponding EP application 12186873.1.
http://devblog.ailon.org/devblog/post/2010/05/21/Automatic-Unit-Converter.aspx.

* cited by examiner

*Primary Examiner* — Michael D Yaary
(74) *Attorney, Agent, or Firm* — Moffat & Co (57) ABSTRACT

A method for computer-implemented unit-conversion method, the method comprising identifying a first numerical value in a first system of units displayed on a computing device, converting the first numerical value in the first system of units into a second numerical value, and displaying the second numerical value and the second system of units on the computing device.

11 Claims, 10 Drawing Sheets

COMPUTING DEVICE WITH AUTOMATED CONVERSION OF UNITS

CROSS-REFERENCE TO RELATED APPLICATIONS

This is the first application filed for the present technology.

TECHNICAL FIELD

The present technology relates generally to computing devices and, in particular, to techniques for automatically converting units.

BACKGROUND

Units of measurements (temperature, distance, mass) may be expressed in different systems, e.g. US customary units or Imperial units (Fahrenheit, miles, pounds) or the metric (SI) system (Celsius, kilometers, kilograms). There exist applications that convert a value expressed in one system of units into an equivalency in another system of units. These are static metrics in that the conversion remains constant in time. There are also dynamic metrics, e.g. currency, where a conversion rate varies in time, according to the marketplace. There are also applications that may be launched on a computing device to convert a value in one currency into an equivalent value in another currency.

The problem with these standalone conversion applications in that they require the user to separately launch the conversion application and to enter (or cut and paste) a value to obtain the result. This is time-consuming and inconvenient, especially on a handheld mobile device where limited screen size limits the ability to view multiple windows at once. Accordingly, it would be highly desirable to provide a technology that would address this shortcoming.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides a novel way for a computing device to convert units from one system of measurement to another system of measurement. The novel method, device and computer-readable medium disclosed herein enables the computing device to convert units from one system to another without requiring the user to launch or utilize a separate conversion application.

Accordingly, one aspect of the present technology is a computer-implemented unit-conversion method that entails identifying a first numerical value in a first system of units displayed on a computing device, converting the first numerical value in the first system of units into a second numerical value, and displaying the second numerical value and the second system of units on the computing device.

Another aspect of the present technology is a computer-readable medium comprising instructions in code which when loaded into a memory and executed by a processor of a computing device cause the computing device to identify a first numerical value in a first system of units displayed on a computing device, convert the first numerical value in the first system of units into a second numerical value, and display the second numerical value and the second system of units on the computing device.

Another aspect of the present technology is a computing device having a display to display a first numerical value in a first system of units on a computing device, and a processor operatively coupled to a memory to identify the first system of units, to convert the first numerical value in the first system of units into a second numerical value and to cause the display to display the second numerical value and the second system of units.

The details and particulars of these aspects of the technology will now be described below, by way of example, with reference to the drawings.

By way of overview, the present technology provides integrated, embedded and automatic conversion of units of measurement on a computing device in an efficient and intuitive manner. The conversion is performed automatically in response to detecting a first numerical value in a first system of units or in response to user input related to the first numerical value. The second numerical value and the second system of units may be displayed in association with the first numerical value, e.g. as a text bubble or callout. This instantly and automatically informs the user as to the value of a system of units that is more familiar to the user. This automatic built-in converter obviates the need for the user to launch or switch to a standalone unit conversion application. This technology may be used on any computing device but is particularly useful for mobile devices with small display screens where it is more difficult to switch back and forth between two apps or two windows, i.e. to switch between a first application that displays the first values to be converted and the second application (i.e. the conversion tool).

Figure 1:
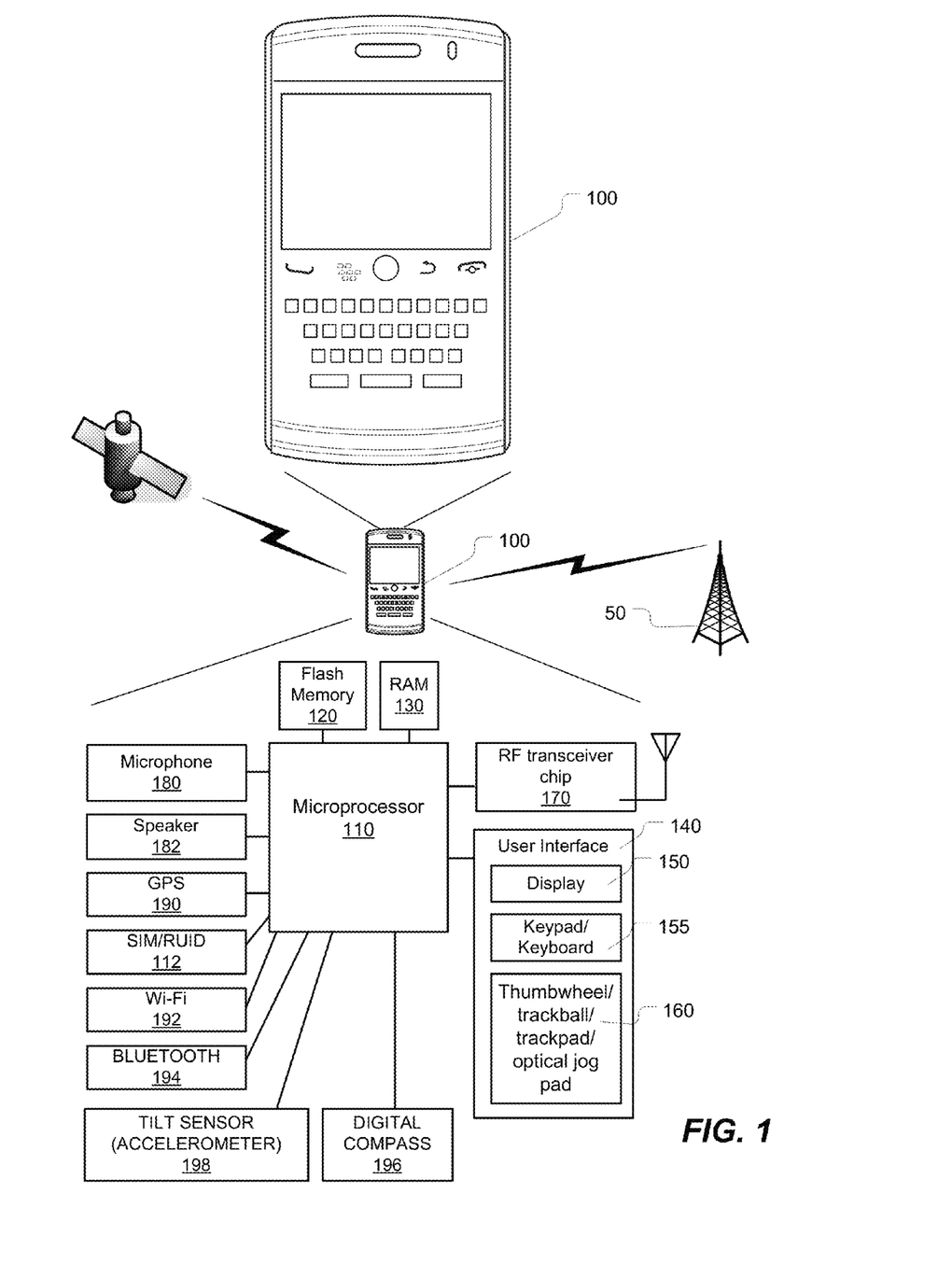
FIG. 1 is a depiction of a mobile device on which the present technology may be implemented, the depiction including a schematic depiction of some components of the mobile device.

FIG. 1 is a depiction of a mobile device as one example of a computing device. This computing device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the computing device 100 includes a user interface 140 for interacting with the device and its applications. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the computing device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

Alternatively, where the computing device is a wired device like a desktop computer, laptop, etc., the transceiver 170 of the computing device 100 may be a modem or equivalent (for wired communications) using, for example, the TCP/IP protocol for Internet data communication. The computing device 100 may also include one or more ports for wired connections, e.g. USB, HDMI, FireWire (IEEE 1394), etc.

The computing device 100 includes a speech-recognition subsystem that has a microphone 180 for transforming voice input in the form of sound waves into an electrical signal. The electrical signal is then processed by a speech-recognition module (digital signal processor) to determine keywords or phrases from the voice input.

Optionally, the computing device 100 may include a speaker 182 and/or an earphone jack.

Optionally, the computing device 100 may also optionally include a positioning subsystem such as a Global Positioning System (GPS) receiver 190 (e.g. in the form of a chip or chipset) for receiving GPS radio signals transmitted from one or more orbiting GPS satellites. Any other Global Navigation Satellite System (GNSS), such as GLONASS or Galileo, may be used for satellite-based positioning. Other positioning subsystems, including radiolocation techniques, signal trace techniques, Wi-Fi™ positioning system (WPS), etc. may also be used to provide current location data for the device.

Optionally, the computing device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the computing device may include other sensors like a digital compass 196 and/or a tilt sensor or accelerometer 198.

As noted above, a mobile device or wireless communications device is one example of a computing device 100 on which the present technology may be implemented. Other computing devices 100 may include desktop personal computers, laptops, palmtops, tablets, game consoles, or other such devices having instant messaging capabilities. As noted above, the technologies disclosed herein may be employed on either wireless or wired devices. For example, where the computing device is a personal computer, the user interface may include a keyboard, a mouse that may optionally be touch-sensitive or have a scroll wheel, roller, or equivalent mechanism for scrolling, an LCD or LED displays screen that may or may not be touch-sensitive. The computer may include an embedded or standalone microphone, a headset with a microphone, a webcam with a microphone, etc. The computer may optionally include an external stylus pad operating in conjunction with a handwriting recognition software module that recognizes characters or symbols written on the pad using a stylus. Such a pad may also be used by the computer to receive a swipe gesture.

To implement this novel integrated unit-conversion technology, the processor 110 and memory 120, 130 of the computing device 100 depicted by way of example in FIG. 1 are configured to cause a display 150 to display a first numerical value in a first system of units on the computing device. The processor 110 is operatively coupled to the memory 120, 130 to identify (recognize) the first system of units, to determine whether the units require conversion, and if so to convert the first numerical value in the first system of units into a second numerical value and to cause the display 150 to display the second numerical value and the second system of units. In one embodiment, the second numerical value and the second system of units is displayed concurrently or simultaneously with the first numerical value and the first system of units. The second numerical value and the second system of units may be displayed in a text bubble, callout, brackets, or any other suitable manner.

For example, the processor may convert numerical values appearing within a message body in an e-mail message. As an example, a Canadian user may receive an e-mail from a friend in England. The message might read, for example, "I just paid £5.50 for a 32 lb salmon that swam about 40 miles up the Thames." The Canadian recipient may wish to know precisely what these values of currency, mass and distance are in a system of units with which he is more familiar. The processor converts the first numerical values into second numerical values, e.g. converts £5.50 into Canadian dollars, 32 lb into kilograms, and 40 miles into kilometers.

Figure 2:
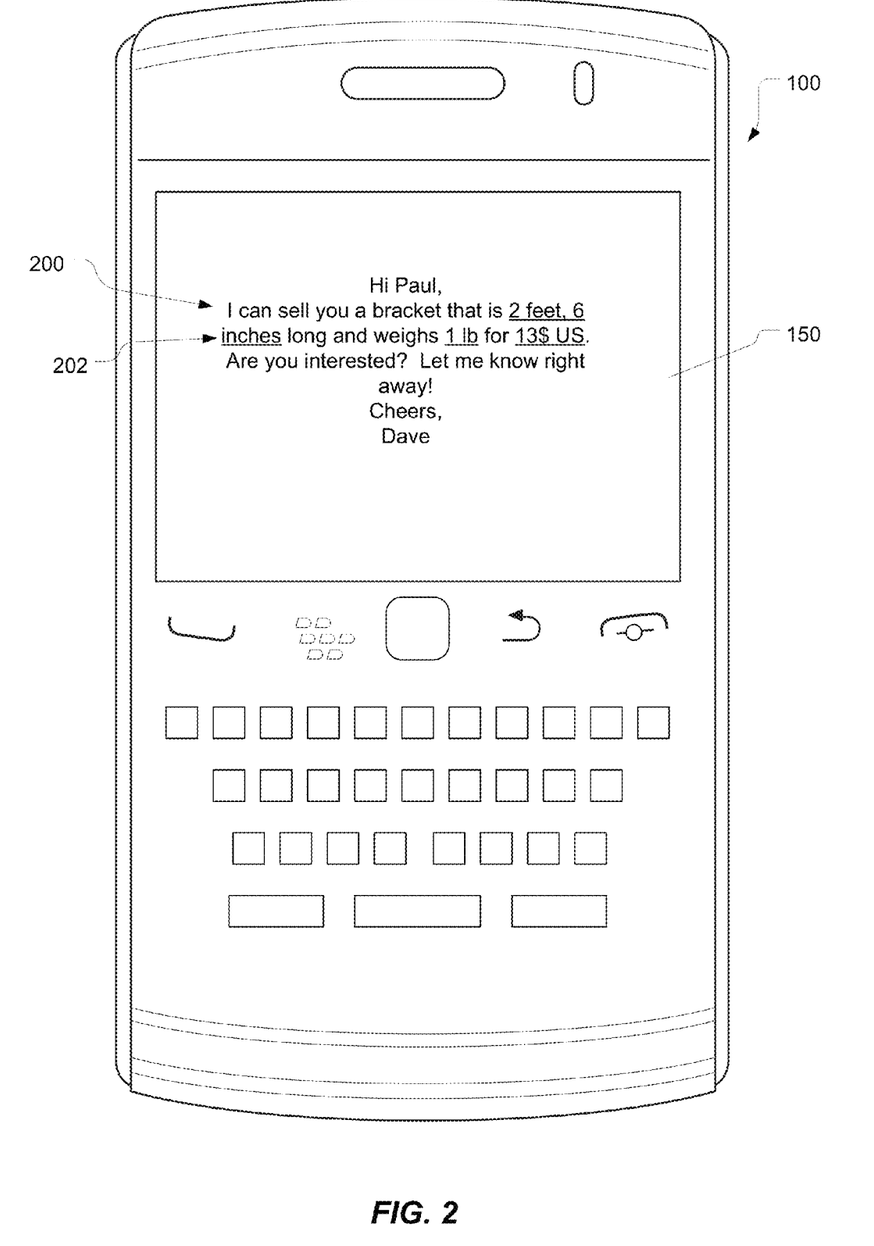
FIG. 2 is a depiction of a mobile device with a keyboard as one example of a computing device that may be used to implement the present technology, showing a message containing various numerical values in one system of units.

FIG. 2 depicts as another example a mobile device 100 displaying a message denoted by reference numeral 200 which has been parsed by the converter to identify units that may require conversion. In other words, the device searches through data content (a body of text) to identify units or unit abbreviations. Once these units or abbreviations are identified (recognized) as such, the application that is presenting the data content on the device sends a request to a conversion service on the device. The conversion service on the device performs the conversion and provides the converted value to the application to enable the application to display the converted value in body of text. In this particular instance illustrated in FIG. 2, there are three units in a first (foreign) system of units requiring conversion. These are "2 feet 6 inches", "1 lb" and "13$ US". When parsing the text, the units may be recognized by their full names or by their abbreviations. In the illustrated embodiment, these first units requiring conversion may be underlined, highlighted, bolded, coloured, italicized, etc. to visually indicate to the user that these units have been identified by the computing device as units requiring conversion. As shown by way of example in FIG. 2, underlining may be employed as a graphical indication 202 to graphical indicate to the user which values are convertible. The units are then converted into a system of units that is preferred by the user. In other embodiments, however, there is no graphical indication of the convertible units (e.g. no underlining or other emphasis) and it should be appreciated therefore that this embedded conversion technology does not require any such graphical indication, highlighting or emphasis of recognized units.

The conversion of units may be either automatic or triggered by user input.

For automatic conversion, the processor is configured to detect the first system of units and to automatically convert the first numerical value in response to detecting the first system of units. This automatic conversion occurs without user input (without user intervention).

For manually-triggered conversion, the processor is configured to receive user input selecting the first numerical value and to convert the first numerical value in response to the user input. In one embodiment, the device recognizes units or their abbreviations and highlights, colors, underlines, bolds, italicizes, or otherwise emphasizes the units or their abbreviations. The units may, in one specific embodiment, be hyperlinked. Selection of the text representing the units and/or the numerical value causes the device to convert the numerical value and to display the second (converted) value.

Determining the second system of units may be done automatically by the computing device. In one embodiment, the computing device may determine the second system of units based on or both of a current location of the device and a device language setting. For example, a device language setting of "French (France)" would convert US or Imperial units into SI units whereas a language setting of "English (United States of America)" would convert units into US customary units. A language setting of "English (Canada)" might (for example) provide a hybrid conversion scheme, e.g. converting into SI units for distance and weather but retaining units of mass in the Imperial system. In a variant, the device may be configured to convert specific units within a type or category of measurement (e.g. convert ounces but not pounds within the type/category of units quantifying mass).

Display of the converted numerical value(s) may be done in any number of ways. For example, in one implementation, the processor causes the display to display a text bubble or callout presenting the second numerical value and the second system of units. This is illustrated by way of example in FIG. 3 and FIG. 5. Display of converted values in brackets is shown by way of example in FIG. 6 and FIG. 7. Another display technique may use a small pop-up window to display the conversion, e.g. "X lbs=y kg" without obscuring the text of the e-mail, document, web page, etc. Any other display technique may be used to present the converted values without obscuring the original values. In a further variant, the device may use a text-to-speech module to speak (audibly) the second numerical value and the units in the second system in response to the user hovering, highlighting or otherwise selecting the first numerical value onscreen.

Figure 3:
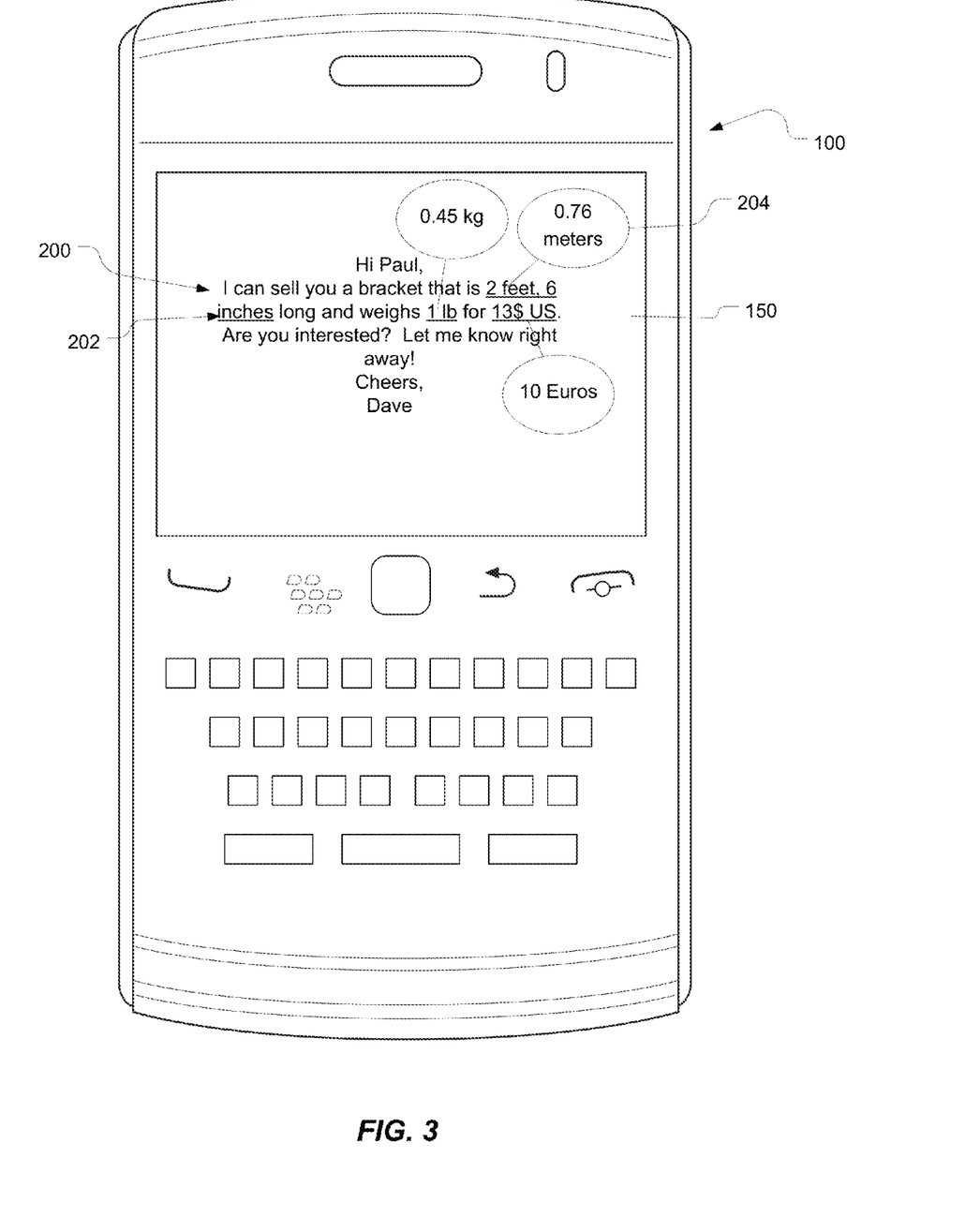
FIG. 3 depicts the mobile device of FIG. 3 displaying converted values in callouts or text bubbles associated with each of the numerical values.

FIG. 3 depicts the displaying of converted units in text bubbles or callouts associated with each one of the first numerical values. As shown by way of example in FIG. 3, the text bubbles or callouts 204 may include the corresponding units or abbreviations thereof in the second system of units.

These text bubbles or callouts 204 may be graphically associated or linked of each of the first numerical values and/or their respective units for intelligibility. As shown in FIG. 3, the callouts or text bubbles are positioned onscreen to avoid obscuring the message 200 that is being displayed on the display 150 of the mobile device 100. In other words, the callouts/bubbles 204 are positioned in the backdrop or margins ("white space") and not over any of the text of the message. The callouts/bubbles 204 may also be automatically resized to fit in the backdrop or margins ("white space") of the message.

Figure 4:
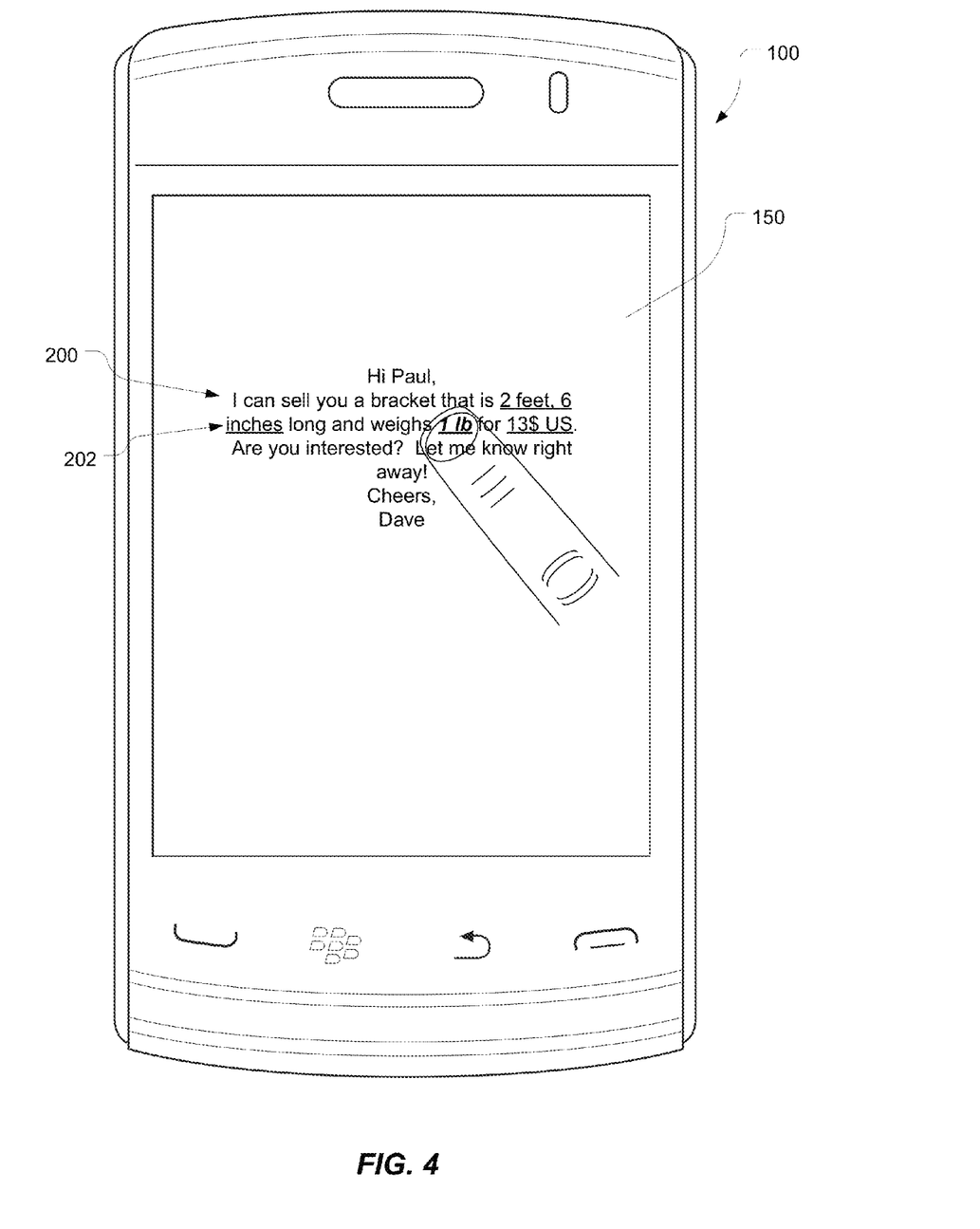
FIG. 4 depicts a touch-screen mobile device as another example of a computing device, the mobile device receiving user input on one of the numerical values to cause the device to convert only that numerical value.

FIG. 4 depicts the user selection of one of the first numerical values in the message. For this example, it is assumed that the device is operating in manual conversion mode, not in automatic conversion mode. In this embodiment, the user selection of a first convertible value triggers the conversion to a second value. In this example, the user touches the underlined or hyperlinked value "1 lb". In response to this user selection (user input), the device converts the first numerical value into a second numerical value in a second system of units.

Figure 5:
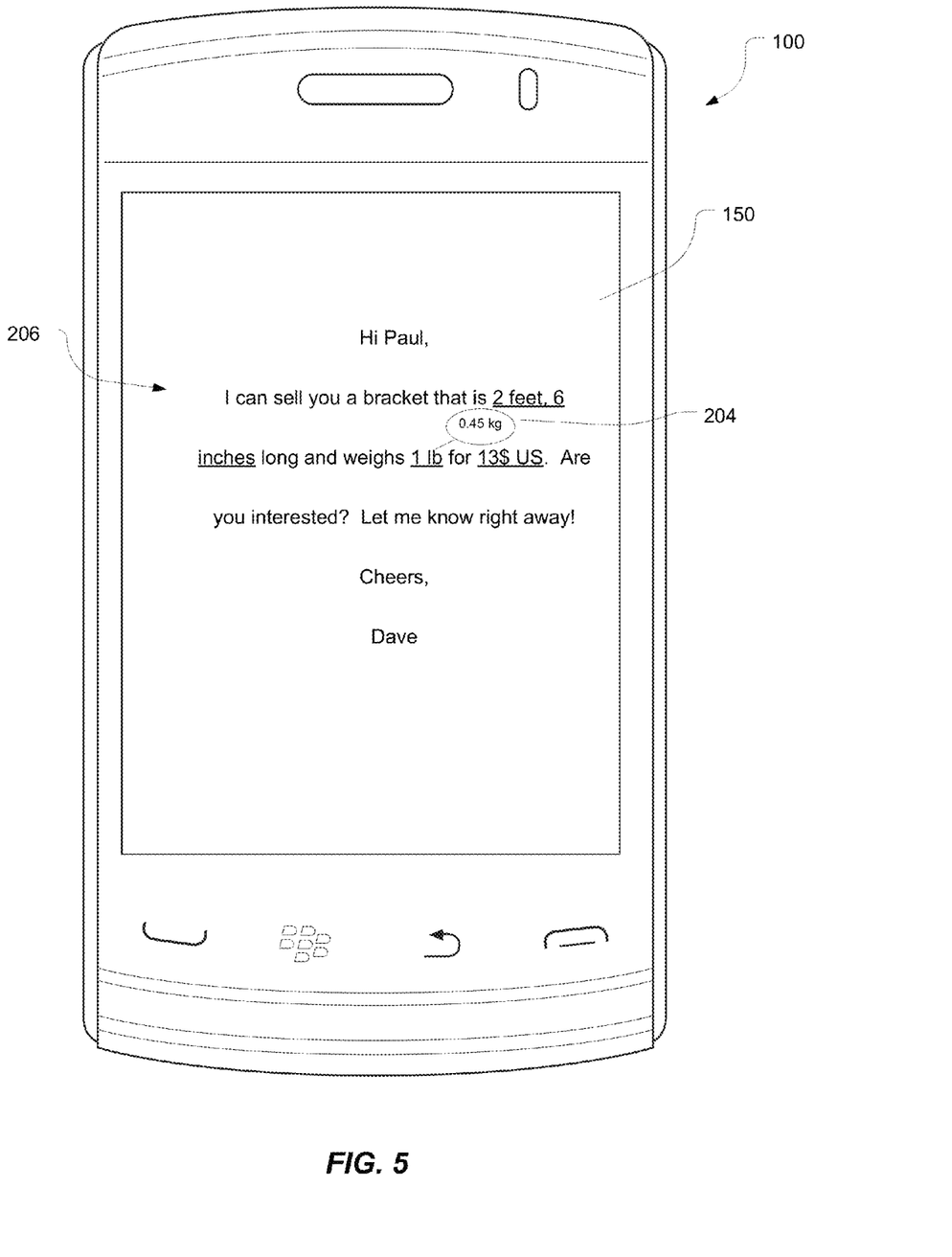
FIG. 5 depicts the touch-screen mobile device displaying reformatted text (with an increased line spacing) and a callout displayed between the lines of text for presenting the converted value.

As shown in FIG. 5, the device then displays the converted value (second numerical value and the second system of units). In this example, 1 lb is converted to 0.45 kg. This second numerical value and its unit abbreviation is placed within a text bubble or callout 206 as shown by way of example. As further illustrated in FIG. 5, the device may automatically reformat the text of the message in order to place the callout/bubble in the spacing between lines. The device may be configured to place callouts/bubbles in the margins or to place these between lines, and to expand the line spacing as necessary to accommodate the bubbles/callouts. Similarly, the size of the callouts/bubbles as well as the font size of the text in the callouts/bubbles may be user-configured or automatically adjusted to fit within available onscreen space. In this particular example, the line spacing is automatically increased to fit the callout/bubble 206 between the lines of the message.

Figure 6:
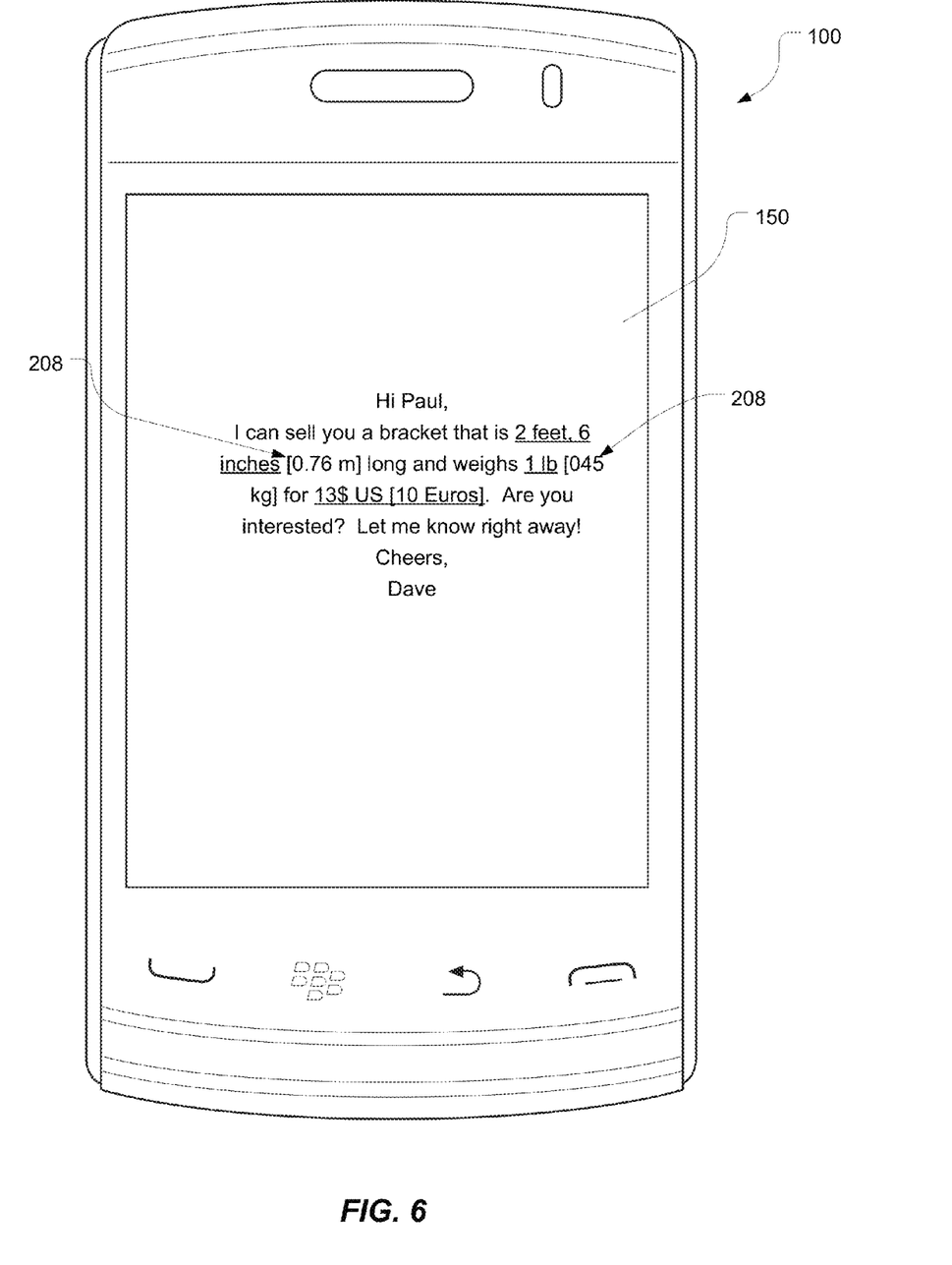
FIG. 6 depicts another example in which the converted values are displayed in brackets within the text.

FIG. 6 depicts a mobile device that presents the converted values in brackets 208 within the text as opposed to within callouts or text bubbles. The device may be configurable to present the converted values and their second system of units in any type of bracket, which is meant to include square brackets (e.g. "[ ]"), braces (e.g. "{ }"), parentheses (e.g. "( )"), slashes (e.g. "/ /"), dashes (e.g. "- -") or any other suitable symbol or graphical indication that can be inserted within the text while enabling the user to distinguish easily between the original text and the inserted converted value.

Figure 7:
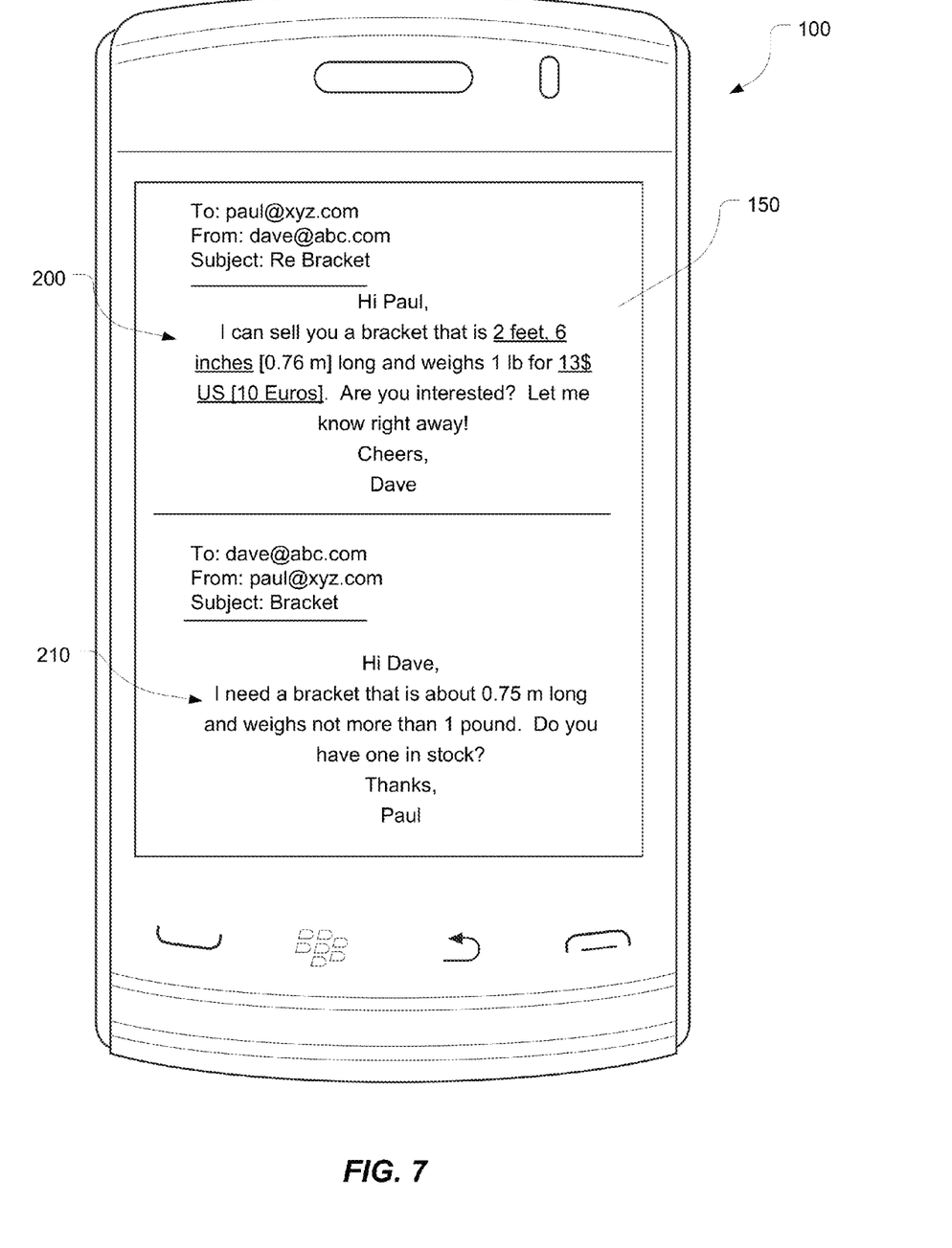
FIG. 7 depicts another example in which the device infers the user's familiarity with units of another system based on the user's usage of those units.

In another embodiment, the computing device determines the second system of units based on an inferred user preference that is inferred by collecting data on the usage patterns of a device user relating to usage of units. FIG. 7 depicts an example of how user preferences may be inferred from the manner in which the user demonstrates familiarity with units. For example, in FIG. 7, the device displays a message exchange between the user and a supplier. In the user's first message, denoted by reference numeral 210, the user refers to a length in meters but a mass in pounds, thus demonstrating familiarity with US customary units at least insofar as it relates to pounds. In the reply message, denoted by reference numeral 200, the numerical value expressed in pounds is not converted because the user has demonstrated a familiarity with pounds by using pounds in the message 210. The device infers (or learns) user preferences by observing how the user uses units. These usage patterns of the user relating to units enable the device to develop a unit-familiarity profile indicating which units the user knows and which the user doesn't.

Conversion of Static Units

Some units are static in the sense that the conversion remains constant in time. Examples of static units include units of temperature, distance, mass, energy, etc. For example, converting Fahrenheit to Celsius or vice versa involves a fixed invariant formula. Likewise, converting miles into kilometers and vice versa involves a constant factor. Other examples of static conversions are converting pounds to kilograms and vice versa, or converting joules of energy into calories and vice versa. As the conversion factors or formulae are invariant, these may be stored in a lookup table or database on the computing device.

Conversion of Dynamic Units

Dynamic units change in time. An example of dynamic units is currency (money). The conversion rates are fluctuating due to market factors. Examples of currency conversions are converting US dollars to Euros, Japanese Yen to Canadian dollars, Swiss Francs to British Pounds, etc. As these conversion rates generally change in time, the device needs to makes a web request to a currency exchange web service to obtain the most recent conversion rates. The conversion rates may then be cached in local memory and refreshed/updated after a certain time elapses, whenever a new conversion is performed, or based on a predetermined schedule, etc.

This technology may also be used to convert between time zones. While times zones are not strictly units, the same principle may be applied to calculate a local time zone based on the time displayed in a body of text, e.g. in an e-mail. For example, an e-mail message from overseas might say: "Call me at 3 p.m. my time" The automatic conversion to local time (e.g. 9 a.m.) is performed automatically or in response to user input by the computing device and then displayed in a callout or text bubble within the received e-mail message. The received e-mail message may be reformatted dynamically to make room for the callout or text bubble.

It should be appreciated from this technique may be used to convert a first numerical value in any form of data content including, but not limited to, e-mail messages, text messages, SMS messages, notifications or transcriptions of voice mail messages, HTML web pages, Microsoft Office documents (e.g. MS Word document, MS Excel spreadsheet, MS PowerPoint presentation, etc), Adobe PDF documents, RSS, social media, or any other data files.

The technology disclosed above thus enables novel computer-implemented methods of converting numerical values in one system of units into numerical values in another system of units. These are summarized with reference to FIGS. 8-10.

Figure 8:
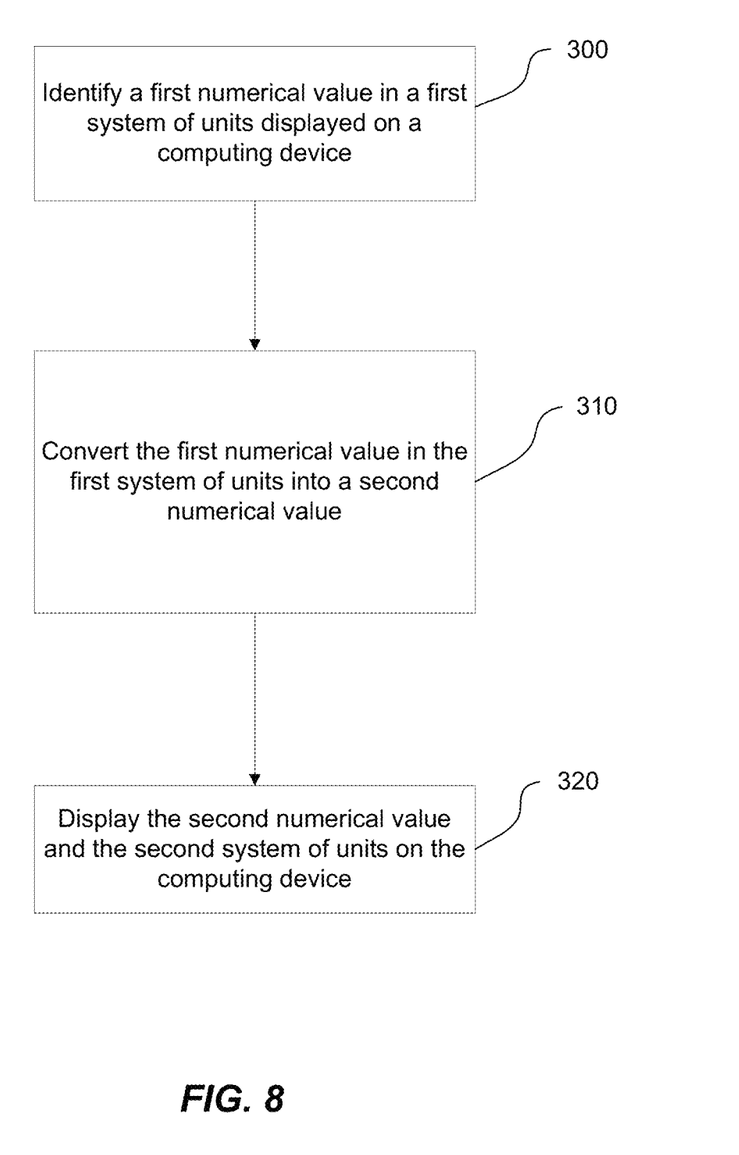
FIG. 8 is a flowchart depicting a method performed by the computing device in accordance with one implementation of the present technology.

As depicted in FIG. 8, a computer-implemented unit-conversion method entails a step 300 of displaying a first numerical value in a first system of units on a computing device, a step 310 of converting the first numerical value in the first system of units into a second numerical value, and a step 320 of displaying the second numerical value and the second system of units on the computing device. The conversion may be automatic or performed in response to user input.

Figure 9:
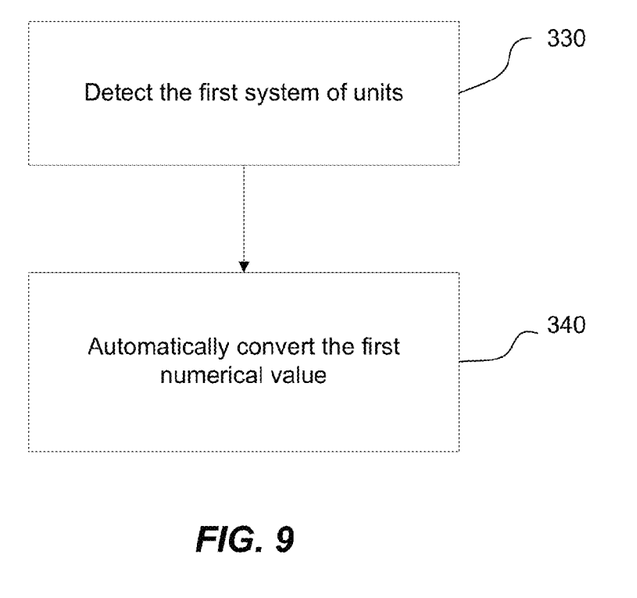
FIG. 9 is a flowchart depicting a further method performed by the computing device in accordance with another implementation of the present technology.

In one implementation, as depicted in FIG. 9, the method entails a step 330 of detecting the first system of units and then a step 340 of automatically (i.e. without user input or user intervention) converting the first numerical value in the first system of units into a second numerical value in a second system of units.

Figure 10:
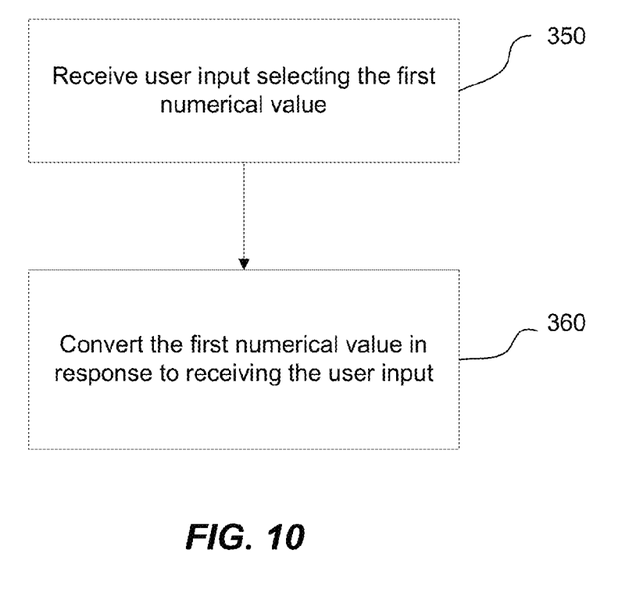
FIG. 10 is a flowchart depicting a further method performed by the computing device in accordance with another implementation of the present technology.

In another implementation, as depicted in FIG. 10, the method entails a step 350 of receiving user input selecting a first numerical value in a first system of units and then a step 360 of converting the first numerical value into a second numerical value in a second system of units in response to receiving the user input. The user input that triggers the conversion may be manual input (touching, clicking the numerical value and/or the units displayed onscreen) or it may be voice input (e.g. saying a command "convert") or it may be contactless gesture input (e.g. a contactless gesture recognizable by a contactless gesture-recognition subsystem on the device).

The unit-conversion application or "unit converter" disclosed herein may be most efficiently implemented in software. The converter may thus be, in one implementation, an automatic embedded conversion tool in the form of a software module, software component or plug-in that is added to an application on the computing device, e.g. added to an e-mail application, IM application, web browser, word processor, etc.

Alternatively, a centralized converter (or conversion service) comprising one or more executable processes may be executed by the operating system (a platform-wide implementation) to run as a background process and to interact with one or more of a plurality of applications on the device. In other words, any application that is displaying numerical values in a system of units that require conversion to a more familiar system of units (as per the device settings) can access or invoke the service to cause the conversion to occur. Because the service interacts automatically with the application to provide the converted values back to the application that requests the conversion, it is not necessary for the user to launch or switch to a separate conversion application.

The converter may scan, search, or parse textual content received or created on the computing device to look for units. Thus, the converter may have a lexicon, dictionary, library, or lookup table of known units and their abbreviations. When the converter recognizes a unit, the device determines if the units require conversion based on a units preference, setting or parameter. The units preference, setting or parameter may specify that the user prefers SI units or the user prefers US customary units (or alternatively prefers Imperial units). A unit preference screen may be provided to enable selection of different units for different measurements or metrics. For example, a user may wish to convert units of distance but not units of temperature or mass. The unit preference screen may also enable the user to specify that units are to be converted only for certain specific types of units. For example, the user may wish the device to convert ounces to grams but not pounds to kilograms.

A converter options screen may be provided to enable the user to specify whether the user wishes automatic conversion or manually-triggered conversion. The converter options screen may also be used to configure the presentation of the converted values, e.g. whether to present in callouts or text bubbles, embed within the text in brackets, or to display only when the user touches, hovers or moves the cursor over numerical value. The converter may automatically hyperlink or activate the text to make it convertible. The device may identify any numerical values in the text using any graphical techniques such as underlining, highlighting, bolding, italicizing, changing the color and/or font, etc.

Figure 11:
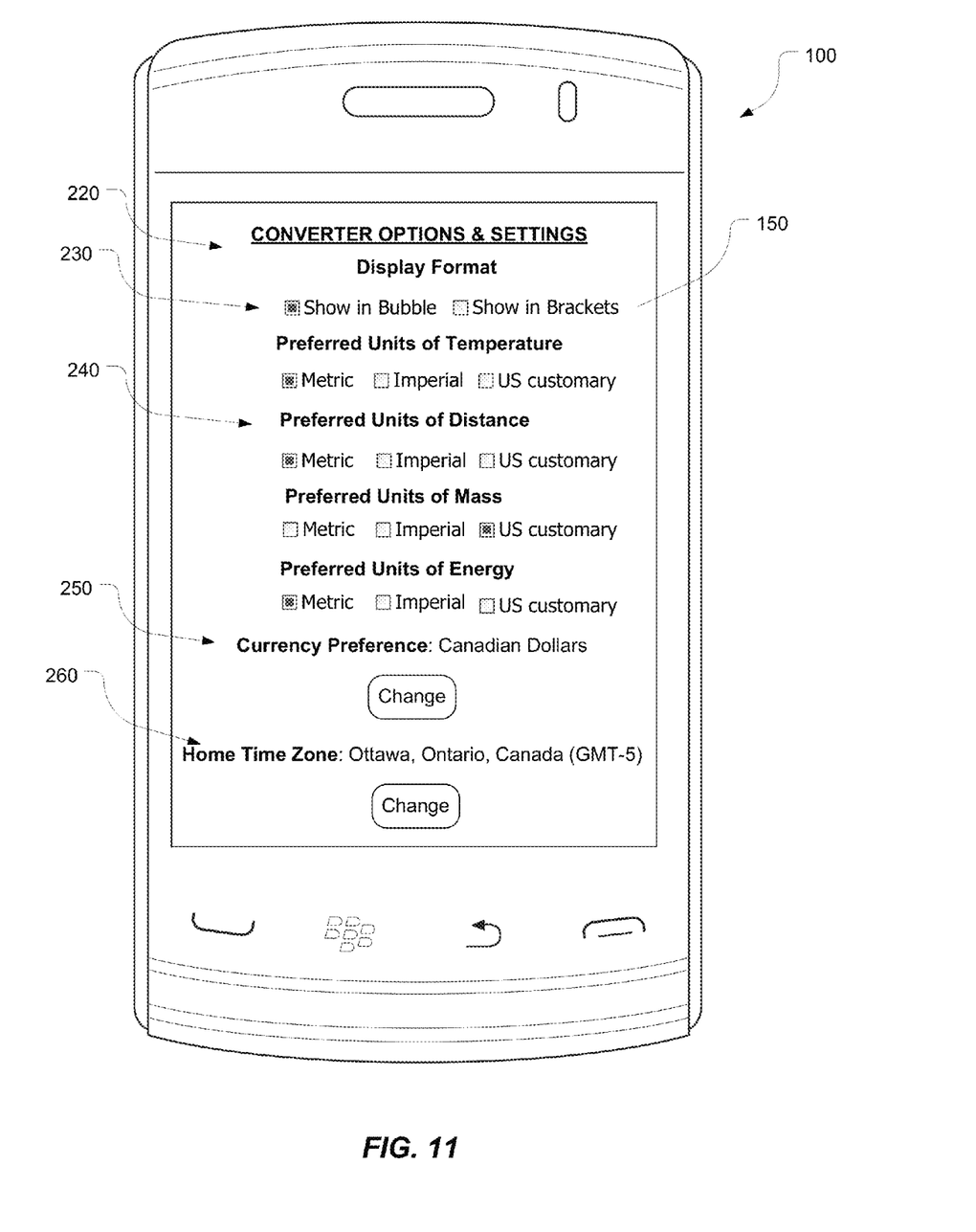
FIG. 11 depicts an example of a converter options and setting page that is presented by the computing device to enable the user to configure preferences for automatically converting different types of units of measurement.

An example of a converter options and settings page is depicted in FIG. 11. As shown by way of example in FIG. 11, the converter options and settings page 220 may include a display format setting 230 to select the manner in which the converted values are to be displayed onscreen. For example, as shown in FIG. 11, this display format setting may be a toggle to switch between a text bubble presentation and a bracketed presentation. As further illustrated in FIG. 11, the options and setting page 220 may include a plurality of type-specific settings 240 for configuring different types of units so as to have a hybrid converter that converts certain types of units but not others with which the user is familiar. Alternatively, a single setting may be provided to select all SI (metric) units or all Imperial Units or all US customary units. Although US customary units are generally the same as Imperial units, there are minor differences in volume units between US customary and Imperial units. However, in the illustrated example, the options and settings page permits the user to specify preferred units for temperature, preferred units for distance, preferred units for mass, preferred units for energy, etc. For the preferred units of temperature, distance, mass, and energy, the user may select among SI (metric) units, Imperial units and US customary units. As further depicted in FIG. 11, the options and setting page 220 may include a currency preference 250 and a home time zone setting 260. In other embodiments, the currency preference and home time zone may be derived from the carrier identifier, language setting, subscriber information, or any other source that indicates where the subscriber lives, works, where the mobile phone was first registered or attached to its home network, etc. Any of this personal information obtained by the device may be used to determine the initial setting for the units preference.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented unit-conversion method comprising:
identifying a first numerical value in a first system of units displayed on a computing device by automatically detecting the first system of units;
automatically converting the first numerical value in the first system of units into a second numerical value in response to identifying the first numerical value in the first system of units by collecting data on the usage patterns of a device user relating to usage of units and by establishing a unit-familiarity profile from the usage patterns, and only automatically converting the first numerical value into the second numerical value if the unit-familiarity profile indicates that the device user is unfamiliar with the first system of units; and
automatically displaying the second numerical value and the second system of units on the computing device.

2. The method as claimed in claim 1 wherein the second system of units is determined based on a current location of the computing device.

3. The method as claimed in claim 1 wherein the second system of units is determined based on a device language setting.

4. The method as claimed in claim 1 wherein displaying the second numerical value and the second system of units comprises displaying a text bubble or callout that presents the second numerical value and the second system of units.

5. A non-transitory computer-readable medium comprising instructions in code which when loaded into a memory and executed by a processor of a computing device cause the computing device to:
identify a first numerical value in a first system of units displayed on a computing device by automatically detecting the first system of units;
automatically convert the first numerical value in the first system of units into a second numerical value in response to identifying the first numerical value in the first system of units by collecting data on the usage patterns of a device user relating to usage of units and by establishing a unit-familiarity profile from the usage patterns, and only automatically converting the first numerical value into the second numerical value if the unit-familiarity profile indicates that the device user is unfamiliar with the first system of units; and
automatically display the second numerical value and the second system of units on the computing device.

6. The computer-readable medium as claimed in claim 5 comprising code to cause the device to determine the second system of units based on a current location of the device.

7. The computer-readable medium as claimed in claim 5 comprising code to cause the device to determine the second system of units based on a device language setting.

8. The computer-readable medium as claimed in claim 5 comprising code to cause the device to display a text bubble or callout presenting the second numerical value and the second system of units.

9. A computing device comprising:
a display to display a first numerical value in a first system of units on a computing device; and
a processor operatively coupled to a memory to identify the first system of units by automatically detecting the first system of units and to automatically convert the first numerical value in the first system of units into a second numerical value in response to identifying the first numerical value in the first system of units by collecting data on the usage patterns of a device user relating to usage of units and to automatically cause the display to display the second numerical value and the second system of units and by establishing a unit-familiarity profile from the usage patterns, and only automatically converting the first numerical value into the second numerical value if the unit-familiarity profile indicates that the device user is unfamiliar with the first system of units.

10. The computing device as claimed in claim 9 wherein the processor determines the second system of units based on or both of a current location of the device and a device language setting.

11. The computing device as claimed in claim 9 wherein the processor converts static units using data on the device and converts dynamic units by using a web service.

* * * * *